United States Patent [19]

Kanno et al.

[11] Patent Number: 4,759,991
[45] Date of Patent: Jul. 26, 1988

[54] MAGNETIC RECORDING MEDIUM HAVING A LUBRICATING COATING LAYER

[75] Inventors: Toshiyuki Kanno, Tokyo; Hitoshi Watanabe, Hachioji; Yasutaro Yasuda, Nagoya; Shiro Kojima, Tokai; Hiroyuki Kato, Nagoya; Takashi Tsuda; Kishiro Azuma, both of Tokai, all of Japan

[73] Assignees: Toagosei Chemical Industry Co., Ltd.; Olympus Optical Co., Ltd., both of Tokyo, Japan

[21] Appl. No.: 707,046

[22] Filed: Mar. 1, 1985

[30] Foreign Application Priority Data

Mar. 6, 1984 [JP] Japan ................... 59-41296
Mar. 6, 1984 [JP] Japan ................... 59-41297
Sep. 4, 1984 [JP] Japan ................... 59-185175

[51] Int. Cl.$^4$ ............................. G11B 5/72
[52] U.S. Cl. ......................... 428/447; 427/44; 427/54.1; 427/128; 427/131; 427/132; 428/694; 428/695; 428/900; 428/522
[58] Field of Search ............ 428/694, 695, 421, 422, 428/900, 447, 522; 427/131, 132, 44, 54.1, 128.1; 360/134–136

[56] References Cited

U.S. PATENT DOCUMENTS

| | | | |
|---|---|---|---|
| 3,390,206 | 6/1968 | Thompson | 525/244 |
| 3,786,116 | 1/1974 | Milkovich | 525/276 |
| 4,171,399 | 10/1979 | Allen | 428/336 |
| 4,368,239 | 1/1983 | Nakajima | 428/522 |
| 4,390,601 | 6/1983 | Ono | 428/900 |
| 4,404,247 | 9/1983 | Dominquez-Burquette | 428/695 |
| 4,434,210 | 2/1984 | Nakajima | 428/900 |
| 4,486,500 | 12/1984 | Naruo | 428/695 |
| 4,501,801 | 2/1985 | Kimura | 428/695 |
| 4,526,833 | 7/1985 | Burquette | 428/695 |
| 4,555,443 | 11/1985 | Kikugawa | 428/695 |
| 4,578,299 | 3/1986 | Kato | 427/44 |
| 4,588,656 | 5/1986 | Kitamoto | 427/131 |
| 4,599,266 | 7/1986 | Nakayama | 428/695 |
| 4,601,950 | 7/1986 | Iida | 428/695 |

FOREIGN PATENT DOCUMENTS 134323 10/1981 Japan ................... 427/131

Primary Examiner—Ellis P. Robinson
Attorney, Agent, or Firm—Cooper & Dunham

[57] ABSTRACT

A magnetic recording medium having a modified surface, consisting essentially of (a) a substrate, (b) a ferromagnetic metal thin film formed on one side of the substrate by a vacuum deposition method, an ion plating method, a sputtering method or a plating method and (c) a lubricating coating layer formed on the thin film or on the back of the substrate or on both of them. The recording medium has an improved running stability, durability and corrosion resistance.

15 Claims, 2 Drawing Sheets

FIG. 1
FIG. 2
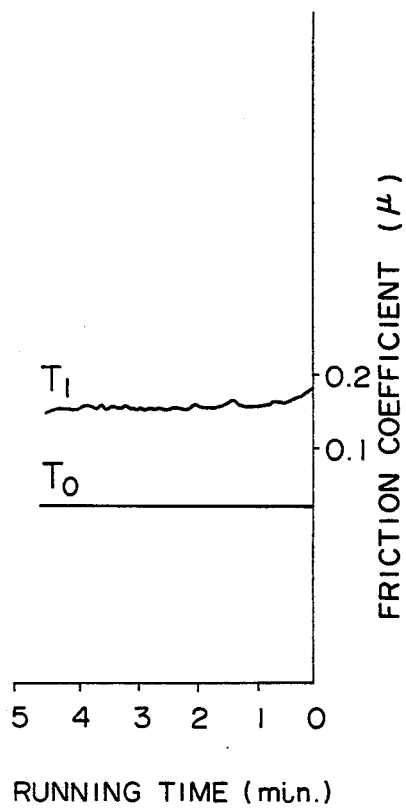
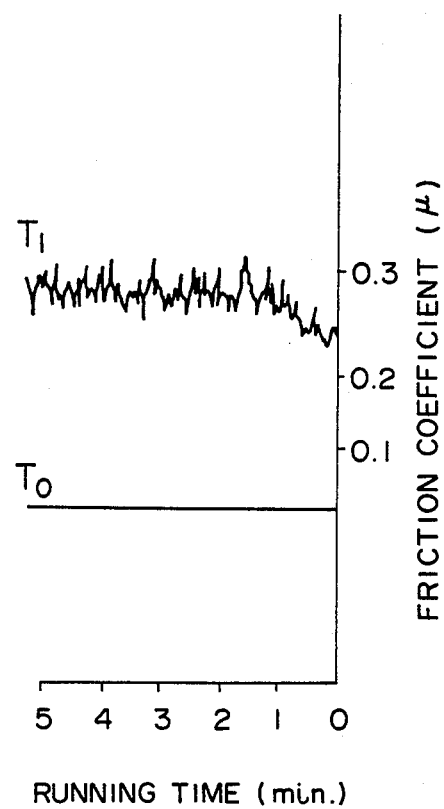

MAGNETIC RECORDING MEDIUM HAVING A LUBRICATING COATING LAYER

This invention relates to a magnetic recording medium having a modified surface, consisting essentially of (a) a substrate, (b) a ferromagnetic metal thin film formed on one side of the substrate by a vacuum deposition method, an ion plating method, a sputtering method or a plating method and (c) a lubricating coating layer formed on the thin film or on the back of the substrate or on both of them.

This invention aims at improving the running stability, durability and corrosion resistance of a magnetic recording medium in which a ferromagnetic metal thin film is used as a recording medium.

In recent years, particular attention has been directed not to magnetic recording media produced by coating a ferromagnetic metal powder together with a binder on a substrate and drying them, but to magnetic recording media produced by forming on a substrate a magnetic layer consisting of a ferromagnetic metal thin film having a higher density and an excellent magnetic recordability by a vapor deposition method, a sputtering method or the like as recording memories such as audio recording tapes, video recording tapes, 8 mm video recording tapes, vertical magnetic recording disks, photomagnetic disks, etc.

The above-mentioned magnetic layer consisting of a ferromagnetic metal thin film tends to be corroded by oxygen, moisture and the like present in air and further is liable to wear upon running in contact with a magnetic head, drum, post and the like. Hence, many studies have been made on a lubricating surface treating agent which can improve the corrosion resistance and wear resistance of the surfaces of the above-mentioned tapes without reducing the electromagnetic transduction characteristics of the surfaces and which can form on the surfaces a thin film having a uniform thickness, a low wear, a strong adhesion and a smoothness as well as on a method of treating a surface with the agent.

As one of the surface treating methods heretofore proposed, there is a method wherein the surface per se of a metal thin film is alloyed or the surface is coated with a thin film having a high hardness and corrosion resistance by forming on its surface a film of a metal or an inorganic oxide such as Mg, Al, Pt, Pd, Cr, Ti, $SiO_2$ or the like by vapor deposition, sputtering or the like (U.S. Pat. No. 3,353,166). This method is effective for improving the corrosion resistance, wear resistance and the like. However, this method has such problems that the adhesion of the coated film is often insufficient though the corrosion resistance, wear resistance and the like are improved, and the high hardness of the coated film causes a rapid destruction of a recording medium and a transducer, and that a complicated treatment is required and a higher cost is incurred. Accordingly, no satisfactory result has been obtained according to this method. Besides, in order to improve the lubricity of the surface of a metal thin film by utilizing the adsorption on the said surface, there have been proposed a method wherein a treating agent such as a wax, a fatty acid, a fatty acid ester, a fatty acid amide, a fluorine-containing surfactant or the like is chemically adsorbed on the surface and a method wherein a treating agent such as a silicone oil, a fluorine-containing oil or the like is coated on the surface of a metal thin film (U.S. Pat. No. 4,390,601). In these methods, the friction of a magnetic recording medium against a magnetic head, etc. is reduced and the durability is temporarily improved; however, the treating agent vaporizes or is removed by scratching during the use of the recording medium and accordingly, it is difficult to keep the effect of the treating agent for a long period of time.

As another method, many proposals have been made for coating the surface of a magnetic layer or the back of a substrate with a high molecular weight substance such as a tetrafluoroethylenetelomer, a urethane resin, a silicone resin, a fluorine resin, an epoxy resin, an ester resin, a radiation- or ultraviolet ray-curing type resin or the like (U.S. Pat. No. 4,268,556). These high molecular weight substances have a temporary effect on low frictional properties, corrosion resistance, durability, etc. However, they cause a reduction of electromagnetic transduction characteristics, which is called a spacing loss. Therefore, considering this, the coating film of a high molecular weight substance must have a thickness of at most 500 Å, desirably about 200 Å, and a uniform, smooth surface. With such a film thickness, however, it is difficult to completely prevent moisture from penetrating the film, there is a variation of friction during running, and the wear resistance and chemical resistance are inferior. Even if a known high molecular weight substance is coated on the surface of the magnetic layer, it is difficult to form a uniform thin film having a small variation of output.

Wear resistance and lubricity are also strongly required for the back of the substrate in order to prevent the tape from creaking and to improve the running stability and durability. For this purpose, it is proposed to provide a back coating layer on the back of the substrate by forming a layer of a non-magnetic metal such as Al, Cu, Ag or the like or by forming a high molecular weight compound layer containing a lubricant. As stated above, many methods have been proposed; however, in any event, according to the prior art, there has been obtained no satisfactory protective layer for the ferromagnetic metal thin film nor satisfactory treating agent for the back side of the substrate.

The present inventors have made extensive research to overcome the drawbacks of the known methods hereinbefore proposed. As a result, there has been found a surface treating agent which can form a uniform protective film having low frictional properties and excellent wear resistance and corrosion resistance on a magnetic layer of a ferromagnetic metal thin film formed on a substrate by a vacuum deposition method, an ion plating method, a sputtering method or a plating method, without reducing the electromagnetic transduction characteristics of the magnetic layer.

According to this invention, there is provided a magnetic recording medium consisting essentially of (a) a substrate, (b) a magnetic layer consisting of a ferromagnetic metal thin film provided on one side of the substrate by a vacuum deposition method, an ion plating method, a sputtering method or a plating method and (c) a lubricating coating layer of a fluorine- or silicone-containing graft polymer formed on the magnetic layer or on the back of the substrate or on both of them.

The magnetic recording medium according to this invention can be produced by providing on one side of a substrate such as a polyethylene terephthalate film (hereinafter referred to as a PET film), a polyimide film, a polyamide film, a polycarbonate plate, an acrylic resin plate, a glass plate or the like, a magnetic layer of a thin film of a magnetic metal including Fe, Co, Ni, Cr, Ga, Ge or the like or an alloy consisting essentially of these metals by a vacuum deposition method, an ion plating method, a sputtering method or a plating method and then by applying onto the magnetic layer and/or the back of the substrate a fluorine- or silicone-containing graft polymer alone or in combination with another surface treating agent to form a lubricating coating layer thereon.

In this invention, in order to enhance the durability and adhesion of the magnetic layer after the formation of the magnetic layer, a primary layer may be formed on the magnetic layer and/or the back of the substrate by applying a primer treatment such as forming a coating film of a high molecular weight compound, an inorganic compound (e.g. $SiO_2$) or the like or allowing the magnetic layer per se, or the like, after which the lubricating coating layer may be formed thereon.

According to this invention, on the magnetic layer is formed a top coat layer excellent in wear resistance, lubricity, corrosion resistance of magnetic layer, and adhesion to magnetic layer; and on the back of the substrate is formed a back coat layer excellent in wear resistance, lubricity and adhesion to substrate. The protective films (lubricating coating layer) thus formed do not adversely affect the magnetic layer, do not reduce the electromagnetic transduction characteristics of the magnetic layer and are excellent in low frictional properties, corrosion resistance and wear resistance. Accordingly, the magnetic recording medium of this invention is excellent in running stability and durability.

In this invention, as the graft polymer there can be used all graft polymers produced by a conventionally known synthesis process such as a chain transfer process, a radiation grafting process, a mechanical or organochemical reaction process, a polymer initiator process, a prepolymer coupling process or the like. However, graft polymers produced by the macromonomer process described in U.S. Pat. Nos. 3,390,206, 3,786,116, or the like are particularly preferred in this invention. That is, graft polymers produced by using, as at least one starting component, a macromonomer, namely, an oligomer having a polymerizable functional group at one end of the molecular chain are preferred.

These preferred graft polymers are produced by processes such as those described in the above-mentioned U.S. Patents. The following is a specific example of the processes: Methyl methacrylate is radical-polymerized in the co-existence of thioglycolic acid to produce a prepolymer having a molecular weight of 1,000 to 10,000 and having one terminal carboxylic acid group. This prepolymer is reacted with glycidyl methacrylate to produce a macromonomer having a methacrylic acid ester type terminal group. This macromonomer is copolymerized polymerized with a fluoroalkyl acrylate [$CF_3$-($CF_2$)$_n$$CH_2$$CH_2$OCOCH=$CH_2$, n being 4 to 12 in the form of a mixture] to obtain a fluorine-containing graft polymer. Of such fluorine-containing graft polymers, those containing 5 to 90% by weight of a fluoroalkyl acrylate unit are preferable, and those containing 10 to 40% by weight of a fluoroalkyl acrylate unit are more preferable. When a fluorine-containing graft polymer contains a fluoroalkyl acrylate unit in a amount of less than 5% by weight, a magnetic recording medium using the graft polymer does not exhibit the properties intended by this invention such as low frictional properties, corrosion resistance and the like. When a fluorine-containing graft polymer contains a fluoroalkyl acrylate unit in an amount of more than 90% by weight, the solubility of the graft polymer in solvents is low, and moreover, the fluorine-modification effect does not increase.

As seen in the above example, the macromonomer used in this invention is an oligomer consisting of a monomer such as an alkyl acrylate, an alkyl methacrylate, styrene, a polyethylene glycol methacrylate, dimethylsiloxane, a fluoroalkyl acrylate or the like which has terminal, polymerizable, functional groups of the vinyl polymerization type (e.g., acryloyloxy, methacryloyloxy, allyloxy, styryl, or the like), the polycondensation addition type (e.g., dicarboxy, dihydroxy or the like), or the like type.

As the graft polymer of this invention, those produced by using the above-mentioned macromonomer are preferred. A graft polymer produced by using a silicone-containing macromonomer obtained by the following method is more preferable.

The silicone-containing macromonomer can be produced, for example, by reacting a living polymer obtained by anion-polymerizing a cyclic siloxane represented by the following general formula (A) as described in Japanese Patent Application Kokai (Laid-Open) No. 126,478/84, with a radical-polymerizable silane compound represented by the following general formula (B):

(A)

wherein $R^1$ is a methyl, ethyl or phenyl group and p is 3 or 4.

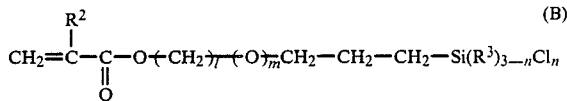
(B)

or

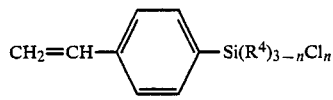

wherein $R^2$ is a hydrogen atom or a methyl group; m is 0 or 1; $R^3$ and $R^4$ are methyl, ethyl or phenyl groups; n is an integer of 1 to 3; and Z is 0, 1 or 2 when m=0 or 2 when m=1.

The anionic polymerization of the above cyclic siloxane can be conducted according to an ordinary process. That is, it can easily be carried out by a bulk or solution polymerization with a known anionic polymerization initiator.

Examples of the cyclic siloxane represented by the general formula (A) include hexamethylcyclotrisiloxane, octamethylcyclotetrasiloxane, hexaethylcyclotrisiloxane, octaethylcyclotetrasiloxane, hexaphenylcyclotrisiloxane, and octaphenylcyclotetrasiloxane. Of these, hexamethylcyclotrisiloxane and octamethylcyclotetrasiloxane are particularly preferred in view of the cost and easiness of anionic polymerization. The anionic polymerization initiator includes known initiators such as organolithium compounds, alkali metal hydroxides, alkali metal alkoxides, alkali metal silanolates and the like. Of these, organolithium compounds are particularly preferred. The molecular weight of the living polymer obtained by the anionic polymerization is important because it governs the molecular weight of a macromonomer produced from the living polymer, and it is controlled by the molar ratio between the cyclic siloxane and the initiator. In order to obtain a macromonomer preferred as a starting material for the graft polymer of this invention, the molar ratio of the initiator to the cyclic siloxane is preferably 0.01 to 0.2. When the molar ratio is less than 0.01, the macromonomer has a very large molecular weight, for example, 20,000 or more. When the molar ratio exceeds 0.2, the macromonomer tends to have a very small molecular weight, for example, 1,000 or less. The molecular weight of the macromonomer is preferably 1,000 to 20,000. When the molecular weight of the macromonomer is less than 1,000, a silicone-containing graft polymer produced from the macromonomer becomes inferior in the silicone effects, namely, water repellency, oil repellency and low frictional properties. When the molecular weight exceeds 20,000, the graft polymer tends to become oily, rendering the purification difficult.

The silicone-containing macromonomer can be produced by a reaction (living polymerization termination) between a living polymer obtained as mentioned above and a radical-polymerizable silane compound represented by the general formula (B). This reaction is readily conducted by mixing the two components.

The radical-polymerizable silane compound represented by the general formula (B) can easily be produced by a known process. For example, a silane compound represented by the formula:

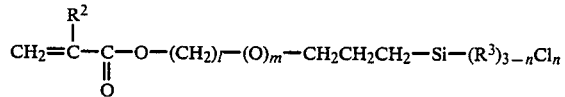

wherein $R^2$, l, m and $R^3$ have the same meanings as defined above, can be produced by subjecting to hydrosilylation (a) an unsaturated (meth)acrylate represented by the formula:

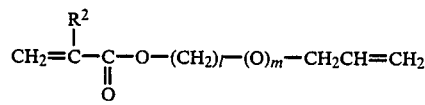

wherein $R^2$, l and m have the same meanings as defined above; and (b) a compound represented by the formula:

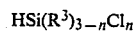

wherein $R^3$ and n have the same meanings as defined above.

The amount of the radical-polymerizable silane compound used in the production of a silicone-containing macromonomer is preferably such that the amount of SiCl in the general formula (B) 1-5 moles per mole of the living polymerization initiator.

Another process for producing the siliconecontaining macromonomer comprises subjecting to condensation reaction (a) 1 equivalent of a Si—OH group of a silicone represented by the following general formula (A') and (b) 0.25 to 1 equivalent of a Si—X group of an acrylic compound represented by the following general formula (B') as described in Japanese Patent Application Kokai (Laid-Open) Nos. 154,766/83 and 20,360/84:

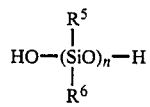

wherein $R^5$ and $R^6$ are independently monovalent, aliphatic hydrocarbon groups having 1 to 10 carbon atoms, phenyl groups or monovalent, halogenated hydrocarbon groups and n is an integer of 1 or more.

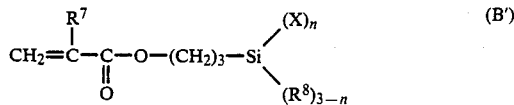

wherein $R^7$ is a hydrogen atom or a methyl group; $R^8$ is a methyl, ethyl or phenyl group; X is a chlorine atom or a methoxy or ethoxy group; and n is a integer of 1 to 3.

The details of the above condensation reaction are as described in Japanese Patent Application Kokai (Laid-Open) Nos. 154,766/83 and 20,360/84. As the silicone represented by the general formula (A'), various types of silicones are easily available, and an appropriate silicone for an intended purpose may be selected therefrom and used. Silicones of the formula (A') wherein $R^5$ and $R^6$ are methyl groups are particularly preferred. The n in the general formula (A') is a parameter for determining the molecular weight of the silicone, and n is preferably 1 to 500, more preferably 10 to 300. When n is less than 1, the silicone effects namely, water repellency, oil repellency and low frictional properties, cannot be obtained. When n exceeds 500, the silicone-containing graft polymer produced from the macromonomer obtained becomes oily, rendering the purification difficult.

As the acrylic compound represented by the general formula (B'), there may be used, for example, γ-methacryloxypropyldimethylchlorosilane, γ-methacryloxypropylmethyldichlorosilane, γ-methacryloxypropylmethyldiethoxysilane, γ-methacryloxypropylphenyldichlorosilane, γ-methacryloxypropylethyldichlorosilane, γ-methacryloxypropyltrichlorosilane, γ-methacryloxypropyltrimethoxysilane, γ-acryloxypropylmethyldichlorosilane, etc. These compounds are known and can easily be produced by reacting a silicone compound with a compound having an aliphatic multiple bond in the presence of chloroplatinic acid.

The reaction between a silicone represented by the general formula (A') and an acrylic compound represented by the general formula (B') proceeds smoothly according to an ordinary process, whereby a silicone-containing macromonomer is obtained. That is, when X of the acrylic compound is a chlorine atom, a dehydrochlorination reaction proceeds and, when X is a methoxy or ethoxy group, a dealcohol condensation reaction proceeds.

The proportion between the silicone and the acrylic compound to be reacted is 0.25 to 1 equivalent of a Si—X group of the acrylic compound per equivalent of a Si—OH group of the silicone. When the proportion of a Si—X group of the acrylic compound is less than 1 equivalent, it follows that in the production of a silicone-containing graft polymer, unreacted silicone remains in a large amount, and when the proportion of a Si—X group of the acrylic compound exceeds 1 equivalent gelation is liable to occur in the production of the silicone-containing graft polymer.

The silicone-containing macromonomer produced as mentioned above contains unreacted starting silicone and by-products. However, such macromonomers can be used as such in this invention without any trouble.

The macromonomer produced as mentioned above is copolymerized with a radical-polymerizable monomer to produce a preferable fluorine- or silicone-containing graft polymer. The radical-polymerizable monomer includes low molecular weight, straight chain, unsaturated hydrocarbons such as ethylene and propylene; vinyl halides such as vinyl chloride and vinyl fluoride; vinyl esters of organic acids such as vinyl acetate; vinyl aromatic compounds such as styrene, substituted styrenes, vinylpyridine and vinylnaphthalene; acrylic acid; methacrylic acid; derivatives of acrylic and methacrylic acids including esters and amides of acrylic and methacrylic acids; N-vinyl compounds such as acrolein, acrylonitrile, N-vinylpyrrolidone and N-vinylcaprolactam; vinylsilane compound such as vinyltriethoxysilane; acrylsilane compounds such as γ-methacryloxypropyltrimethoxysilane; etc. There may also be used di-substituted ethylenes such as vinylidene fluoride, vinylidene chloride and the like. Furthermore, maleic anhydride, maleic acid esters, fumaric acid esters, etc. may be used. These radical-polymerizable monomers may be used alone or in combination of two or more. Graft polymers produced by subjecting the above radical-polymerizable monomers to multi-component polymerization have, in general, an excellent film formability and can be used alone.

In the copolymerization of the radical-polymerizable monomer and the macromonomer, the macromonomer is used in an amount of preferably 2 to 90 parts by weight, more preferably 10 to 40 parts by weight, per 100 parts by weight of the sum of the amounts of the two monomers when the macromonomer is a silicone-containing macromonomer. When the amount of the silicone-containing macromonomer is less than 2 parts by weight, it is difficult for the resulting graft polymer to provide the required levels of low frictional properties, wear resistance and corrosion resistance. When the amount exceeds 90 parts by weight, the solubility of the resulting graft polymer in solvents becomes low, and the modification effect of the silicone is not enhanced.

In order to allow the graft polymer to have a film formability and an affinity with the magnetic layer, it is desirable that part of the radical-polymerizable monomer be replaced by a monomer having a hydroxyl or carboxyl group such as acrylic or methacrylic acid [hereinafter referred to as (meth)acrylic acid], hydroxyethyl (meth)acrylate or the like.

It is also desirable to impart a curability with active energy rays to the graft polymer because the object of this invention, namely, to provide low frictional properties and excellent wear resistance and corrosion resistance, can be well achieved.

As methods for imparting the curability by active energy rays to the graft polymer, there are a method wherein a photosensitive group or a functional group such as an epoxy group is introduced into a graft polymer in the course of the production of the graft polymer by replacing part of the radical-polymerizable monomer by a photosensitive monomer or copolymerizing an epoxy group-containing monomer, a method wherein at first an epoxy, hydroxyl or carboxyl group is introduced into the graft polymer by copolymerizing a monomer having one of these groups and then the group introduced is reacted with a compound having a photosensitive group, and other similar methods.

As a radical-polymerizable and photosensitive monomer, there may be used, for example, methacrylates of oxychalcone represented by

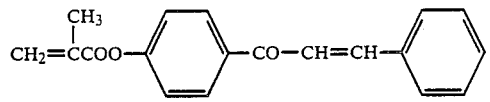

or

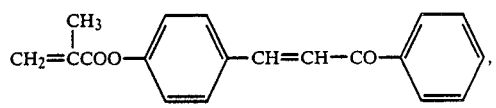

and an esterification product between cinnamic acid and 2-hydroxyethyl methacrylate.

Copolymerization of a macromonomer with a radical-polymerizable monomer having an epoxy group (e.g., glycidyl methacrylate) gives an epoxy group-containing graft polymer having curability with radiation.

When a photosensitive monomer is used in the copolymerization, the proportion of the monomer in the resulting graft polymer is preferably 1 to 80% by weight, more preferably 5 to 70% by weight. Meanwhile, the proportion of a fluoroalkyl acrylate unit or dimethyl polysiloxane unit in the graft polymer is preferably 5 to 90% by weight, more preferably 10 to 70% by weight. When the proportion of the photosensitive monomer is less than 1% by weight, it is difficult to obtain the excellent effects required for the graft polymer such a crosslinkability, mechanical properties, solvent resistance, etc. When the proportion of the photosensitive monomer exceeds 80% by weight, the amount of a fluoroalkyl acrylate unit or dimethyl polysiloxane unit decreases correspondingly, and superior characteristics given by silicone or fluorine become insufficient. When the amount of a fluoroalkyl acrylate unit or dimethyl polysiloxane unit is less than 5% by weight, the superior characteristics of silicone or fluorine cannot be exhibited and, when the amount exceeds 90% by weight, the solubility of the resulting graft polymer in solvents becomes low.

When the macromonomer is copolymerized with an epoxy group-containing monomer such as glycidyl methacrylate or the like to produce a radiation-curable graft polymer, it is necessary that the proportion of a fluoroalkyl acrylate unit or dimethyl polysiloxane unit in the graft polymer be similar to that in the above-mentioned photosensitive, graft polymer, and the proportion of the epoxy group-containing monomer be preferably 1 to 90% by weight, more preferably 5 to 80% by weight.

In the method wherein a graft polymer having an epoxy, hydroxyl, amino or carboxyl group is produced and then the polymer is reacted with a compound having a photosensitive group, the macromonomer may be copolymerized with such an epoxy group-containing monomer, for example, glycidyl methacrylate, such a hydroxyl group-containing monomer, for example, 2-hydroxyethyl methacrylate, or such a carboxyl group-containing monomer, for example, acrylic acid, to obtain a graft polymer and then the graft copolymer thus obtained may then be reacted with a compound having a photosensitive group such as a carboxylic acid compound having a cinnamic acid residue, a chalcone residue, an acrylic acid residue or the like, a hydroxyl compound, an isocyanate compound, an acid halide compound, an epoxy compound or the like.

The reaction between a graft polymer having a functional group and a compound having a photosensitive group can be conducted by various known processes. For example, the following processes can be used:

(1) Reaction between an epoxy group-containing graft polymer and a photosensitive group-containing carboxylic acid compound It is preferable to subject a mixture of an epoxy group-containing graft polymer and a photosensitive group-containing carboxylic acid compound to reaction in a solvent such as toluene, xylene, tetrahydrofuran, methyl ethyl ketone, butyl acetate, ethyl acetate, dimethylformamide or the like with a catalyst such as an amine compound, for example, triethylamine, tripropylamine, or the like or a quaternary ammonium salt, for example, tetrabutylammonium bromide, triethylbenzylammonium chloride, or the like. The amount of the catalyst used is usually 0.01 to 5% by weight, preferably 0.05 to 3% by weight, based on the total amount of the reaction mixture and the solvent. The reaction temperature is usually 50° to 150° C., preferably 70° to 120° C. The reaction time is usually 1 to 24 hr, preferably 2 to 10 hr.

As the photosensitive group-containing carboxylic acid compound, there may be used, for example, cinnamic acid, p-nitrocinnamic acid, furylacrylic acid, (meth)acrylic acid and reaction products between dibasic acid anhydrides, for example, succinic anhydride, maleic anhydride, phthalic anhydride and tetrahydrophthalic anhydride, and (meth)acrylates having a hydroxyl group.

(2) Reaction between a carboxyl group-containing graft polymer and a photosensitive group-containing epoxy compound This reaction can be conducted smoothly in quite the same manner as in (1) above.

The photosensitive group-containing epoxy compound usable in the above reaction includes glycidyl cinnamate, glycidyl (meth)acrylate, etc.

(3) Reaction between a hydroxyl group-containing graft polymer and a photosensitive group-containing acid halide compound or a photosensitive group-containing isocyanate compound When a photosensitive group-containing acid halide compound is used, it may be mixed with a hydroxyl group-containing graft polymer, followed by subjecting it to dehydrohalogenation. In this case, it is preferable to use a known catalyst which is employed in conventional dehydrohalogenation, for example, pyridine, triethylamine or the like. The photosensitive group-containing acid halide compound which can be used in said reaction includes cinnamoyl chloride, p-nitrocinnamoyl chloride, furylacryloyl chloride, (meth)acryloyl chloride, etc.

When a photosensitive group-containing isocyanate compound is used, it is preferable to use a known catalyst which is employed in a conventional urethane reaction, for example, dibutyltin dilaurate, dibutyltin maleate or the like. The photosenstive group-containing isocyanate compound which can be used in this reaction includes 2-isocyanatoethyl (meth)acrylate, reaction products between an acrylate group-containing hydroxyl compound and a diisocynate compound, etc.

In these reactions, it is preferable to use a solvent to allow the reaction to proceed smoothly. As the solvent, there may be used, for example, toluene, xylene, tetrahydrofuran, diethyl ether, etc.

In the production of a graft polymer by copolymerizing a macromonomer with a radical-polymerizable monomer, conventionally known processes can be used such as, for example, a radiation-irradiating process and a process employing a radical polymerization initiator. The process employing a radical polymerization initiator is preferred in view of the easiness of polymerization procedure and the easiness of control of the molecular weight of graft polymer produced, and specifically, there can be used any of a solution polymerization process, a bulk polymerization process and an emulsion polymerization process. The graft polymer produced using the polymerizable macromonomer can be regarded as consisting of (a) a trunk composed of a polymer of the radical-polymerizable monomer and (b) branches composed of the macromonomer.

The graft polymer produced as mentioned above can alone possess excellent properties intended in this invention, that is, can improve the surface of the magnetic layer and/or the back of the substrate in the respects of adhesion, low frictional properties, wear resistance and corrosion resistance. These excellent properties intended by this invention can be obtained also when the graft polymer is dissolved in a surface treating agent (whose details will be described later) and the resulting solution is coated on the surface of the magnetic layer and/or the back of the substrate. This is because the graft polymer used in this invention has a very high transferability to surface, and therefore, when it is added to a surface treating agent and the mixture is formed into a film in an ordinary environment such as air or an inert gas (e.g., nitrogen), the graft polymer transfers toward the film surface and is concentrated there, whereby the surface of the coating film can easily be modified.

When a graft polymer is dissolved in a surface treating agent and is used as a top coat or a back coat, the surface treating agent may be any of the surface treating agents which are compatible with the graft polymer. The surface treating agent consists of a polymer or of a polymer and a solvent. The polymer may be, for example, a multi-component copolymer of an α,β-ethylenically unsaturated monomer, an α,β-ethylenically unsaturated carboxylic acid and a derivative thereof; a polymer produced by a polycondensation reaction; a polymer produced by a polyaddition reaction, or the like. In addition, as a polymer precursor, a curable composition consisting of a radical-polymerizable component may be used. As regards the polymer, specific examples of the α,β-ethylenically unsaturated monomer include styrene, acrylonitrile, vinyl chloride and the like, specific examples of the α,β-ethylenically unsaturated carboxylic acid include mono- and di-valent carboxylic acids such as (meth)acrylic acid, maleic acid and the like, and specific examples of the derivatives of α,β-ethylenically unsaturated carboxylic acid include alkyl esters of (meth)acrylic acid (alkyl is ethyl, butyl, 2-ethylhexyl, etc.) and hydroxyalkyl esters of (meth)acrylic acid (hydroxyalkyl is hydroxyethyl, hydroxypropyl, etc.). These monomers are polymerized in combination, whereby a lacquer of the normally-drying type or a clear enamel of the baking type is obtained; and they are used as surface treating agents.

The polymers produced by a polycondensation reaction include linear polyester resins, alkyd resins, polyamide resins and epoxy resins, all being produced by an ordinary polycondensation reaction.

The polymers produced by a polyaddition reaction include polyurethane resins, polyurea resins and the like, all being produced by an ordinary polyaddition reaction. Besides, they include coating agents of the silicone resin type and the fluorine resin type.

Together with these polymers, there may be used cellulose derivatives such as ethylcellulose, butylcellulose, nitrocellulose and the like.

When the curable composition composed of radical-polymerizable components as a polymer precursor is used, the composition may be heat-polymerized and cured with a radical polymerization initiator, redox-polymerized and cured at about room temperature using a radical polymerization initiator and a polymerization-curing accelerator together, or ultraviolet-cured with a photopolymerization initiator or electron-radiation-cured with or without a photopolymerization initiator or cured by other methods. Any of the compositions which can be polymerized and cured by such methods may be used. Specific examples of the radical-polymerizable components include (meth)acrylic acid ester monomers, unsaturated polyesters, poly(meth)acrylic acid esters, urethane (meth)acrylates, epoxy (meth)acrylates, polyamide (meth)acrylates and thiol-/ene type polymers.

The amount of the graft polymer added to the surface treating agent is preferably 0.01% by weight or more based on the weight of the polymer or radical-polymerizable component in the surface treating agent. When the amount is less than 0.01% by weight, the intended effect on the surface of the coated film cannot be sufficiently inhibited.

These surface treating agents may be used in solution in an organic solvent or without being dissolved in an organic solvent. In general, it is better to use the surface treating agent as an organic solvent solution type surface treating agent. This is because this type increases the dissolvability of the graft polymer; increases the transferability of the graft polymer to the surface of the coating film as well as the orientability of fluorine or silicone toward the film surface; and enables the formation of a thin film which does not adversely affect the electromagnetic transduction characteristics of the magnetic layer which is one of the objects of this invention; and simultaneously enables the formation of a uniform and smooth surface due to viscosity-decrease. The organic solvent usable in this invention include hydrocarbons such as toluene, xylene, cyclohexane and the like; esters such as ethyl acetate, butyl acetate and the like; ketones such as methyl ethyl ketone, methyl isobutyl ketone and the like; methyl Cellosolve; ethyl Cellosolve; and the like. These solvents can be used alone or in admixture of two or more. Depending upon the means for applying the solution of the surface treating agent, there may further be added, to the solution, additives such as an antistatic agent, an extender pigment, a wax, a levelling agent and the like.

A treating agent having lubricating characteristics consisting of the graft polymer alone or a mixture of the graft polymer and the surface treating agent is coated on the surface of a recording medium such as a tape, a vertical magnetic recording disk, a photomagnetic disk or the like, consisting of a substrate such as a plastic, glass or the like and a ferromagnetic metal thin film formed on one side of the substrate by a vacuum deposition method, an ion plating method, a sputtering method or a plating method, or on the back of the substrate. However, the method of coating the treating agent may vary depending upon the shape of the recording medium, and various known coating methods can be employed such as gravure coating, gravure offset coating, slit reverse coating, spray coating, spinner coating, dipping coating, curtain flow coating and the like. The treating agent is coated by one of these methods, dried and then is subjected, depending upon the type of the treating agent or if necessary, to cross-linking with an isocyanate resin, or when a radical-polymerizable composition is used, it is subjected to polymerization-curing by heat, an ultraviolet ray or electron radiation, to form a tough film, upon which on the surface of the magnetic layer and/or the back of the substrate can be formed a coating layer having a thickness of at least several tens of Å satisfying the objects of this invention. This coating layer can exhibit excellent effects which have never been obtained.

When an active energy radiation-curable graft polymer is used, the graft polymer can be cured with a radiation such as electron rays, $\gamma$ rays or the like or with an ultraviolet light.

For example, an ultraviolet ray-curable graft polymer is easily cured by exposing to an ultraviolet ray emitted from a high pressure mercury lamp for several seconds, to give a cured material which is strong and insoluble in solvents. This graft polymer is also cured easily by exposing to electron radiation at an accelerating voltage of 165 KV and a dose of 5 Mrad, to give a cured material having similar properties.

When the composition of this invention is polymerized and cured with an ultraviolet ray, the composition may contain a photopolymerization initiator or photosensitizer such as an acetophenone (e.g., 2,2'-diethoxyacetophenone or p-tert-butyltrichloroacetophenone), a benzophenone (e.g., benzophenone), a ketone (e.g., Michler's ketone), a benzil (e.g., benzil), a benzoin (e.g., benzoin ether), a ketal (e.g., benzyl methyl ketal) or a thioxanthone (e.g., 2-chlorothioxanthone or 2-ethylthioxanthone).

Next, this invention will be explained referring to Examples and Comparative Examples and also referring to the accompanying drawings. In the accompanying drawings, FIG. 1 is a graph showing a relation between running time and friction coefficient in respect of a vapor deposition tape obtained in Example 3;

FIG. 2 is a graph showing a relation between running time and friction coefficient in respect of a metallized tape obtained in Comparative Example 4;

In FIGS. 1 to 4, $T_0$ refers to in-tension and $T_1$ refers to out-tension.

Figure 3:
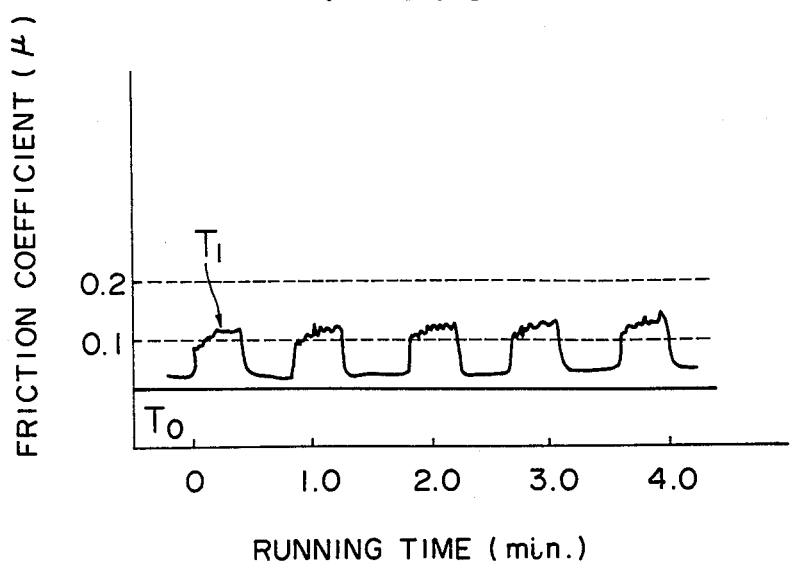
FIG. 3 is a graph showing a relation between running time and friction coefficient in respect of a metallized tape obtained in Example —.
Figure 4:
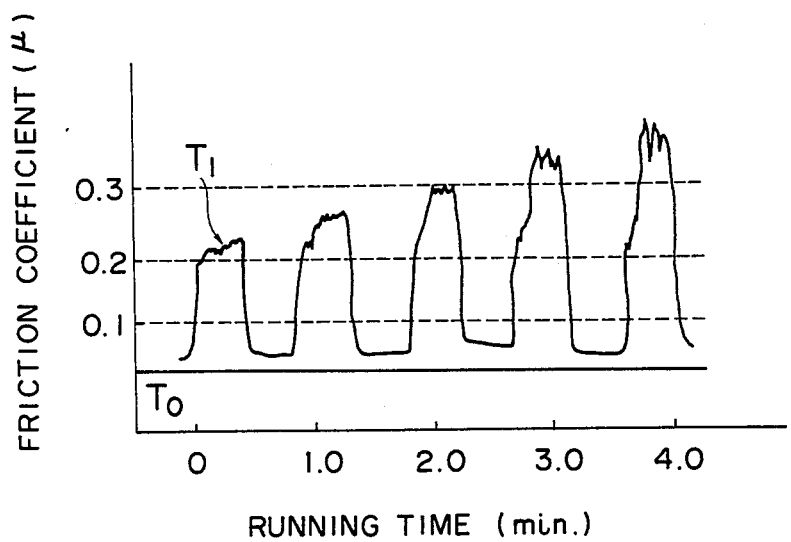
FIG. 4 is a graph showing a relation between running time and friction coefficient in respect of a metallized tape obtained in Comparative Example 9.

The following Examples and Comparative Examples are only part of many experiments and this invention is in no way restricted to them. In the Examples and Comparative Examples, part is part by weight and % is % by weight unless otherwise specified, and the friction coefficient of metallized tape during running was calculated by the following equation:

$$\mu = 1/\theta \times \ln T_1/T_0$$

$T_1$: In-tension
$T_1$: Out-tension
Speed: 14.2 mm/sec.
$\theta = 180°$

REFERENCE EXAMPLE 1

Into a glass flask equipped with a stirrer, a reflux condenser, a dropping funnel, a thermometer and a gas inlet were charged 10 parts of methyl methacrylate (hereinafter referred to as MMA) and 83 parts of an acetone (17.5%)-toluene mixed solvent. After introducing N₂, to the resulting solution were added under reflux 0.5 part of azobisisobutyronitrile (hereinafter referred to as AIBN) as a polymerization initiator and 0.32 part of thioglycolic acid as a chain transfer agent to start polymerization. Thereafter, 90 parts of MMA was dropped thereinto continuously over 4.5 hr, and a solution of 2.88 parts of thioglycolic acid dissolved in 7 parts of toluene was added in 9 portions at 30 min intervals; and 1.5 parts of AIBN was added in 3 portions at 1.5 hr intervals. Thereafter, refluxing was continued for a further 2.5 hr to complete the polymerization, thereby obtaining a solution of a polymer having the structural formula [I] indicated hereinafter. The reaction temperature was 77° to 87° C. Part of the reaction mixture was subjected to reprecipitation using n-hexane, and the resulting precipitate was dried and subjected to measurement of acid value. The acid value was 0.340 mg equivalent/g.

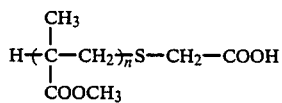
[I]

Next, part of acetone was removed by distillation from the reaction mixture. To the residue were added 0.5% of triethylamine as a catalyst and 200 ppm of hydroquinone monomethyl ether as a polymerization inhibitor, and further added 1.2 moles of glycidyl methacrylate (hereinafter referred to as GMA) per mole of the acid. Then, reaction was conducted for 11 hr under reflux at about 110° C. The reaction conversion calculated from decrease of the acid value was 96%. The reaction mixture was added to 10 parts of n-hexane per part of the mixture to precipitate the reaction product. The precipitate was dried at 80° C. under reduced pressure to obtain 90 parts of a macromonomer having the structural formula [II] indicated below. The polystyrene reduced molecular weight of the macromonomer was measured by gel permeation chromatography (hereinafter referred to as GPC) to obtain a value of 2,840 (number average) and a value of 6,470 (weight average). The hydroxyl value was 0.350 mg equivalent/g.

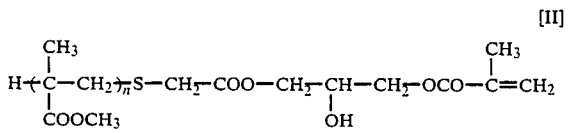
[II]

REFERENCE EXAMPLE 2

To the same reactor as in Reference Example 1 were added 70 parts of the macromonomer obtained in Reference Example 1, 30 parts of a mixed fluoroalkyl acrylate having the structural formula [III] indicated below, 270 parts of trifluorotoluene ($C_6H_5CF_3$) and 0.35 part of AIBN. After introducing N₂, reaction was conducted for 5 hr under reflux at about 100° C.

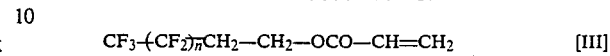
[III]

(n=4 to 12 in the form of a mixture having an average n value of about 7)

The resulting reaction mixture was added to 10 parts of methanol per part of the mixture to precipitate a reaction product. The precipitate was dried at 80° C. under reduced pressure to obtain 67 parts of a graft polymer.

This graft polymer showed a single peak in GPC and the polystyrene-reduced molecular weight was 10,800 (number average) or 21,700 (weight average).

Using trifluorotoluene as a internal standard substance and employing CDCl₃ as a solvent, H-NMR spectrum was measured of the above graft polymer. From the ratio of the areas of the H of trifluorotoluene and the H of —O—CH₃ in the MMA unit of the polymer, the content of MMA unit in the graft polymer was calculated to obtain a value of 60%.

Accordingly, the content of fluoroalkyl acrylate unit in the graft polymer was 40%.

REFERENCE EXAMPLE 3

Using the same reactor and the same procedure as in Reference Example 2, synthesis was conducted by a macromonomer process. In this case, the amount of a fluoroalkyl acrylate fed was reduced to obtain a fluorine-containing graft polymer containing 31% of the fluoroalkyl acrylate unit and having a molecular weight of about 12,000 (number average).

REFERENCE EXAMPLE 4

Into a glass flask provided with a stirrer, a reflux condenser, two dropping funnels, a thermometer and a gas-blowing inlet was charged 200 parts of benzotrifluoride, and in one of the dropping funnels was placed 200 parts of a fluoroalkyl acrylate having the structural formula [III], while a mixture of 7.08 parts of 3-mercaptopropionic acid, 4 parts of AIBN and 100 parts of benzotrifluoride was placed in the other dropping funnel. After introducing a nitrogen gas into the flask, the flask was heated to keep the contents of the flask at 70° C., and the contents of the two dropping funnels were added dropwise over 2 hr at said temperature. The contents of the flask were subjected to reaction for a further 4 hours, upon which the polymerization conversion of fluoroacrylate reached 95.8%. Subsequently, the temperature of the reaction mixture was elevated and refluxed for 2 hr, and thereafter cooled to maintain the temperature of the reaction mixture at 90° C. To the reaction mixture were added 0.1 part of hydroquinone monomethyl ether, 13.95 parts of GMA, and 2.5 parts of tetrabutylammonium bromide (hereinafter referred to as TBAB). Furthermore, the nitrogen-blowing was changed to air-blowing, and the mixture was then subjected to reaction at 90° C. for 6 hr. The reaction conversion was determined by titration with a base to obtain a value of 94.6%. The reaction mixture was poured into 10 parts of methanol per part of the mixture to precipitate the product, and the precipitate thus obtained was dried under reduced pressure to obtain 152.3 parts of a solid fluorine-containing macromonomer.

In a flask provided with a condenser, a stirrer and a thermometer were placed 30 parts of the fluorine-containing macromonomer, 70 parts of MMA, 200 parts of benzotrifluoride as a solvent and 2 parts of AIBN as a radical polymerization initiator, and the resulting mixture was subjected to reaction at 75° C. for 8 hr in a nitrogen atmosphere. The reaction mixture thus obtained was poured into 10 parts of methanol per part of the mixture to precipitate the product, and the precipitate thus obtained was separated by filtration and dried under reduced pressure at 80° C. to obtain 92 parts of a graft polymer. In the same manner as in Reference Example 2, the graft polymer was analyzed to find that the MMA unit content in the graft polymer was 67% and the fluoroalkyl acrylate unit content was 33%.

EXAMPLES 1–3 and COMPARATIVE EXAMPLES 1–4

By a vapor deposition method, a magnetic layer of a ferromagnetic alloy thin film consisting of 80% of Co and 20% of Ni was formed on a PET film of 12μ in thickness while introducing oxygen gas forcibly, whereby a metallized tape was produced.

On the surface of this metallized tape or the back of the substrate of the tape was coated a treating agent whose formulation is shown later, by a slit reverse coating method or a gravure coating method. The treating agent was cured by drying it with hot air and further cured by irradiating it with an ultraviolet ray. In each of Examples 1 and 2 and Comparative Examples 1 to 4, a film of about 200 Å in thickness was formed on the surface of the magnetic layer and a film of 1μ in thickness was formed on the back of the substrate. Various properties were measured of the surface of the magnetic layer and the back of the substrate. The results are shown in Table 1 and FIGS. 1 and 2.

[Surface treating agent and film formation]

EXAMPLE 1

The fluorine-containing graft polymer obtained in Reference Example 2 was dissolved in a mixed solvent consisting of toluene and MEK (50/50 by weight) to adjust the concentration of the polymer to 5%. The resulting solution was applied to the metallized tape by a slit reverse coating method and dried at 90° C. for 3 min with hot air.

EXAMPLE 2

The fluorine-containing graft polymer obtained in Reference Example 4 was dissolved in MEK at a concentration of 5%, and the resulting solution was applied to the metallized tape by a slit reverse coating method, and dried at 90° C. for 3 min.

EXAMPLE 3

The fluorine-containing graft polymer obtained in Reference Example 2 was added to a resin composition having the following formulation in a proportion of 30% based on the weight of the composition:

| | |
|---|---|
| Ultraviolet ray-curable type, epoxy-modified acrylate (VR-77, manufactured by Showa Highpolymer Co., Ltd.) | 35 parts |
| Dipentaerythritol hexacrylate (DPHA, manufactured by Nippon Kayaku Co., Ltd.) | 29 parts |
| Oligoester acrylate (ARONIX M-7200X, manufactured by Toa Gosei Chemical Industry Co., Ltd.) | 30 parts |
| Photopolymerization initiator (2,2-dimethoxy-2-phenyl acetophenone/chlorothioxanthone = 2/1) | 5 parts |
| Antistatic agent (RESISTANT RE 132, manufactured by Dai-ichi Kogyo Seiyaku Co., Ltd.) | 1 part |

The resulting composition was dissolved in a mixed solvent consisting of toluene, ethyl acetate and MEK (2/1/2 by weight) at a concentration of 5%. The resulting solution was coated and cured by irradiating the coat with an ultraviolet rays from three high pressure mercury lamps (beam-condensing type, 80 W/cm) manufactured by IWASAKI ELECTRIC CO., LTD.) at a tape speed of 50 m/min.

Treating agent for the back of substrate and film formation

EXAMPLES 1 to 3

| | |
|---|---|
| Fluorine-containing graft polymer obtained in Reference Example 2 | 12 parts |
| Urethane-modified, polyfunctional acrylate type resin (UNIDICK 17-824, manufactured by DAINIPPON INK & CHEMICALS, INC.) | 50 parts |
| Nitrocellulose derivative (CAB-551-001, manufactured by Eastman Kodak Co.) | 5 parts |
| Carbon black (acetylene black) | 30 parts |
| Photopolymerization initiator (2,2-dimethoxy-2-phenyl acetophenone/chlorothioxanthone = 2/1) | 3 parts |

A composition consisting of the above components was dissolved in a mixed solvent consisting of toluene, ethyl acetate and MEK (2/1/2 by weight) in a proportion of 15% based on the weight of the mixed solvent. The resulting solution was applied to the back of the substrate by a gravure plate of 200 mesh and was cured by irradiating it with an ultraviolet ray emitted from three high pressure mercury lamps (beam-condensing type, 80 W/cm) at a tape speed of 50 m/min. [Surface treating agent and film formation]

COMPARATIVE EXAMPLE 1

On the magnetic layer of the metallized tape produced above was coated a 5% ethanol solution of a perfluoroalkylethyleneoxide addition product (FLUORAD FC-430, manufactured by SUMITOMO 3M LIMITED) by a slit reverse coating method, and dried at 90° C. for 3 min.

COMPARATIVE EXAMPLE 2

On the magnetic layer of the metallized tape was coated an aqueous 0.05 g/liter solution of a poly(potassium vinylsulfate) manufactured by Wako Pure Chemical Industries, Ltd. by a dipping method. Then, the magnetic layer was washed with a large amount of pure water and the residual water was removed by spraying a dry air, after which the magnetic layer was dried with hot air at 80° C.

COMPARATIVE EXAMPLE 3

On the magnetic layer of the metallized tape was formed a titanium film of 200 Å in thickness by a vacuum deposition method.

COMPARATIVE EXAMPLE 4

A film was formed on the magnetic layer of the metallized tape in the same manner as in Example 3, except that 3 parts of a fatty acid ester (RIKEMAL PL-002, manufactured by RIKEN VITAMINE CO., LTD.) as a lubricant was substituted for the fluorine-containing graft polymer.

[Treating agent for the back of substrate and film formation]

COMPARATIVE EXAMPLES 1 to 4

To 90 parts of a polyurethane resin (PARAPREN, manufactured by NIPPON POLYURETHANE INDUSTRY CO., LTD.) produced from a polyisocyanate and a polyester produced by a polybasic organic acid and a polyol were added 5 parts of a cellulose derivative (CAB 551-001, manufactured by Eastman Kodak Co.), 3 parts of a PE wax and 2 parts of a fatty acid amide. The resulting composition was dissolved in a mixed solvent consisting of toluene and MEK (1/1 by weight) at a concentration of 15%. By a gravure coating method, the resulting solution was coated on the back of the substrate of the metallized tape, and dried with hot air at 90° C. for 3 min.

cording media had no scar by reel, hub, or the like at the backsides of the substrates and neither dew condensation nor blocking were caused.

EXAMPLE 4

On a glass plate was formed a Te film of 300 Å in thickness by a vacuum deposition method. Thereon was coated by a spinner coating method a solution produced by dissolving the following composition in a mixed solvent consisting of ethyl acetate, MIBK, ethanol and a fluorine-inert liquid (FLUORINERT 77, manufactured by SUMITOMO 3M LIMITED) (35/35/15/15 by weight) at a concentration of 10%. Then, the coated solution was cured by irradiating it for 30 sec. with an ultraviolet ray emitted from a water-cooling type high pressure mercury lamp (Jet Light JL-4300, manufactured by ORC Manufacturing Co., Ltd.), whereby a protective film of 200 Å in thickness was formed. The R/W characteristics of the resulting optical recording material were completely the same as that of the material free of the protective film, and the R/W characteristics did not change even after the durability test. This material with the protective film had the same reproduced output as that of the material free of the protective film. Between the Te film and the protective film or on the protective film may be formed a $SiO_2$ film of $2\mu$ in thickness by a vacuum deposition method, whereby more advantageous effects can be obtained.

| Fluorine-containing graft polymer | 35% |

TABLE 1

| | Magnetic layer side | | | | | | Back of substrate | | |
|---|---|---|---|---|---|---|---|---|---|
| | Effect on electromagnetic transduction characteristic | Dynamic friction coefficient ($\mu$) | Wear resistance After running | Wear resistance Scratch strength | Corrosion resistance | Contact angle | Adhesion | Dynamic friction coefficient ($\mu$) | Wear resistance (after running) |
| Example 1 | No change | 0.15 | ◉ | 190 g | No change after one month | 105° | ◉ | 0.15 | ◉ |
| Example 2 | Same as above | 0.16 | ◉ | 180 g | Same as above | 104° | Same as above | Same as above | Same as above |
| Example 3 | Same as above | 0.16 | ◉ | 200 g or above | Same as above | 104° | Same as above | Same as above | Same as above |
| Comparative Example 1 | Same as above | 0.28 | x | 70 g | Occurrence of rust spots after 10 days | 35° | ○ | 0.17 | x − Δ |
| Comparative Example 2 | Same as above | 0.30 | Δ | 60 g | Same as above | 100° | Same as above | Same as above | Same as above |
| Comparative Example 3 | Same as above | 0.42 | ◉ | 180 g | Occurrence of rust spots after 15 days | 75° | Same as above | Same as above | Same as above |
| Comparative Example 4 | Same as above | 0.24 | ○ | 130 g | Same as above | 85° | Same as above | Same as above | Same as above |

*Electromagnetic transduction characteristic was evaluated by observing the variation of output compared with untreated tape at frequencies of 1 to 4 Hz when a video deck was used.
*Dynamic friction coefficient ($\mu$) was measured by using a HEIDON's surface tester and a sapphire needle of 10.0 mm in diameter.
*Wear resistance was evaluated by fixing a test tape to a video deck and running the tape for 5 min, and then observing the scratch and peeling on both sides of the tape by a microscope.
*Scratch strength was measured by load variation when a sapphire needle of 2 mm in diameter was used.
*Corrosion resistance was evaluated by observing the change of the surface of magnetic layer with time by a microscope when a test tape was stored in an environment of 60% and 95% relative humidity.
*Adhesion was evaluated by a cellotape test.
*Contact angle was measured by using a distilled water (CA-A type) supplied by KYOWA SCIENTIFIC CO.

As appreciated from the above results, the magnetic recording media produced from the fluorine-containing graft polymers of this invention had an improved low frictional properties, wear resistance, water repellency and corrosion resistance without sacrifying the electromagnetic transduction characteristics of the magnetic layers. Therefore, there could be obtained magnetic recording media excellent in durability, low in variation of friction coefficient as seen from FIG. 1 and accordingly excellent in running stability. Further, these re-

| of Reference Example 2 | |
|---|---|
| Ultraviolet ray-curable type resin (ADEKA B-6136J, manufactured by ASAHI DENKA KOGYO K.K.) | 60% |
| Catalyst (PP-33) | 3% |
| Levelling agent (SURFLON S-281, manufactured by Asahi Glass Co., Ltd.) | 2% |

EXAMPLE 5

On a PET film substrate of 50μ in thickness having a good surface was formed a Co-Cr (85:15 by weight) magnetic film having a vertical anisotropy by a sputtering method, whereby a vertical magnetic recording medium was produced. On the magnetic layer of this recording medium was coated by a spinner coating method a 5% solution prepared by dissolving the fluorine-containing graft polymer obtained in Reference Example 2 in a mixed solvent consisting of toluene, MEK and a fluorocarbon solvent (FLUORINERT 77, manufactured by SUMITOMO 3M LIMITED) (1/1/1 by weight), whereby a protective film of about 100 Å in thickness was formed.

As a result, there was obtained a lubricating layer of high wear resistance having a friction coefficient (μ) of 0.08 and a scratch strength of 180 g. Further, this vertical recording medium did not reduce S/N ratio due to steam permeability specific to fluorine-containing graft polymer and was good in corrosion resistance.

REFERENCE EXAMPLE 5

In a flask were placed 0.5 g (0.0128 mole) of metallic potassium and about 5 ml of n-hexane. Thereto was added dropwise 10 ml of methanol over 30 min in a dry nitrogen stream with ice-cooling. Then, after stirring for 30 min, the excessive methanol and n-hexane were removed by distillation under reduced pressure. Subsequently, thereto were added 40 g (0.135 mole) of octamethylcyclotetrasiloxane and 40 g of tetrahydrofuran sufficiently dehydrated by a molecular sieve. The whole mixture was refluxed for 4 hr. The molar ratio of potassium salt to octamethylcyclotetrasiloxane was 0.095. After the temperature of the reaction mixture came down to room temperature, there was slowly dropped 31 g of a 10% tetrahydrofuran solution of γ-methacryloxypropyldimethylchlorosilane (0.0141 mole as γ-methacryloxypropyldimethylchlorosilane). After completion of the dropping, the stirring was continued at room temperature for a further 30 min. The equivalent ratio of Si-Cl of γ-methacryloxypropyldimethylchlorosilane to potassium salt was 1.10. The resulting potassium chloride precipitate was removed by filtration and the filtrate was poured into 1 liter of methanol to precipitate a silicone-containing macromonomer. The precipitate was separated by decantation and dried to obtain 26.0 g of a colorless, transparent, oily macromonomer.

The macromonomer had a polystyrene-reduced number average molecular weight by GPC was 8,900.

Next, the macromonomer obtained above and MMA were subjected to copolymerization. In the copolymerization, 50 parts of the macromonomer, 50 parts of MMA, 1.0 parts of AIBN and 300 parts of toluene were placed in a flask equipped with a condenser and a stirrer, and reaction was conducted at 80° C. for 24 hr in a nitrogen atmosphere. After the reaction, the toluene and unreacted MMA were removed by distillation under reduced pressure to obtain a white, solid reaction product.

Then, the reaction product was subjected to extraction with n-hexane for removal of unreacted macromonomer, and then to drying under reduced pressure, thereby obtaining 82 parts of a white powder of a silicone-containing graft polymer. This silicone-containing graft polymer was soluble in toluene, xylene and thinner.

Analysis showed that the silicone-containing graft polymer had a silicone content (as dimethyl polysiloxane) of 35% and a polystyrene-reduced number average molecular weight by GPC was 32,000.

In the analysis of silicone content, about 0.2 g of the silicone-containing graft polymer was weighed into a platinum crucible, and thereto was added about 3 ml of concentrated sulfuric acid, after which the crucible was placed in an electric furnace and heated at 700° C. for 2 hr. The silicone content was measured as a $SiO_2$ content.

REFERENCE EXAMPLE 6

In a four-necked flask equipped with a stirrer, a thermometer, a condenser and a nitrogen-introducing tube were placed 336 g (0.15 mole) of an α,ω-dihydroxypolydimethylsiloxane

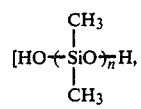

average of n=30], 12.4 g (0.05 mole) of γ-methacryloxypropyltrimethoxysilane and 3.5 g of potassium acetate. They were subjected to reaction at 150° C. for 20 hr in a nitrogen atmosphere. After cooling, the reaction mixture was poured into 1,360 g of toluene to precipitate potassium acetate, and the precipitate was removed by filtration.

To 1,000 parts of the macromonomer solution thus obtained were added 400 parts of MMA, 400 parts of ethyl acrylate (hereinafter referred to as EA), 10 parts of AIBN and 1,530 parts of toluene to form a uniform solution, and the solution was then subjected to reaction at 75° C. for 7 hr in a nitrogen atmosphere to obtain a 33% toluene solution of a silicone-containing graft polymer. The silicone-containing graft polymer had a silicone content of 20% in terms of dimethylpolysiloxane.

REFERENCE EXAMPLE 7

In 400 ml of diethyl ether were dissolved 220 g (0.1 mole) of the same α,ω-dihydroxydimethylpolysiloxane as in Reference Example 6 and 9.49 g (0.12 mole) of pyridine dissolved, and into the resulting solution was slowly dropped a 10% diethyl ether solution of 22.06 g (0.1 mole) of γ-methacryloxypropyldimethylchlorosilane over 20 min at room temperature.

Reaction started immediately and a white crystal of pyridine hydrochloride precipitated. After completion of the dropping, stirring was continued at room temperature for a further 1 hr, and the crystal of pyridine hydrochloride was removed by filtration.

The filtrate was transferred to a separating funnel, and 500 ml of water was further placed therein, after which the separating funnel was thoroughly shaken and then the contents were water-washed. After the water-washing, the separating funnel was allowed to stand to separate the upper ether layer from the lower water layer. Anhydrous Glauber's salt was added to the ether layer separated. The mixture was allowed to stand at room temperature for one night for dehydration. Then, anhydrous Glauber's salt was removed by filtration. The resulting filtrate was subjected to distillation under reduced pressure to remove the ether, thereby obtaining 205 g of a colorless, transparent, silicone-containing macromonomer.

This macromonomer and MMA were copolymerized. In the copolymerization, 50 parts of the macromonomer, 50 parts of MMA, 1.0 part of AIBN and 300 parts of toluene were placed in a flask equipped with a condenser and a stirrer, and they were subjected to reaction at 80° C. for 24 hr in a nitrogen atmosphere, thereby obtaining a silicone-containing graft polymer. This silicone-containing graft polymer had a silicone content of 34% in terms of dimethylpolysiloxane.

REFERENCE EXAMPLE 8

In a flask equipped with a condenser, a stirrer and a thermometer were placed 50 parts of the silicone-containing macromonomer obtained in Referential Example 5, 40 parts of MMA, 10 parts of acrylic acid (hereinafter referred to as AA), 400 parts of MEK and 3 parts of AIBN, and the resulting mixture was subjected to reaction at 75° C. for 8 hr in a nitrogen atmosphere. After the completion of the reaction, the MEK and unreacted MMA were removed by distillation under reduced pressure to obtain a white, solid reaction product.

Subsequently, the unreacted silicone-containing macromonomer was separated from the reaction product by extraction with n-hexane, and the residue was dried under reduced pressure to obtain 85 parts of a white, powdery silicone-containing graft polymer.

As a result of analysis of the graft polymer, the silicone content in the graft polymer was 40%, and the acid value was 78 mg KOH/g. Moreover, the polystyrene-reduced number average molecular weight of the polymer by GPC was 19,000.

EXAMPLES 6 to 9 and COMPARATIVE EXAMPLES 5 to 7

On a PET film substrate of $12\mu$ in thickness was formed by a vacuum deposition method a magnetic layer of a ferromagnetic alloy thin film consisting of 80% of Co and 20% of Ni while introducing oxygen gas forcibly, whereby a metallized tape was produced. On the magnetic layer of the metallized tape or on the back of the substrate was coated a treating agent having the formulation shown in Table 2, by a slit reverse coating method, and then cured by drying it with hot air and then cured by irradiating it with an ultraviolet ray, whereby a film of about 300 Å in thickness was formed on the magnetic layer and a film of about $1\mu$ in thickness was formed on the back of the substrate. The resulting metallized tapes were subjected to measurement of characteristic properties both on the magnetic layer and on the back of the substrate. The results are shown in Table 3.

TABLE 2

| | Formulation of surface treating agent for magnetic layer and treating condition | | Formulation of treating agent for substrate and treating conditions | |
|---|---|---|---|---|
| Example 6 | *The silicone-containing graft polymer obtained in Reference Example 6 was dissolved in a mixed solvent of toluene/MEK/ ethyl acetate (1/1/1 by weight) at a concentration of 3%. The resulting solution was coated and then dried with hot air at 90° C. for 2 min. | | *Composition of Example 5 *PE wax (SAN WAX 151, manufactured by SANYO CHEMICAL INDUSTRIES LIMITED) *Antistatic agent (ELECTRO-STRIPPER, a cationic surfactant manufactured by Kao Corp.) The above materials were dissolved in a mixed solvent of toluene/MEK (1/1 by weight) at a concentration of 15%. The resulting solution was coated and dried with hot air at 90° C. for 2 min. | 96 parts 3 parts 1 part |
| Example 7 | *Silicone-containing graft polymer obtained in Reference Example 5 | 15 parts | Same as above | |
| | *Hydroxyacryl copolymer resin (NIKALITE H-172, manufactured by Nippon Carbide Industries Co., Ltd.) | 75 parts | | |
| | *Isocyanate curing agent (CORONATE L, manufactured by Nippon Carbide Industries Co., Ltd.) The above materials were dissolved in a mixed solvent of toluene/MEK (1/1 by weight) at a concentration of 3%. The resulting solution was coated and dried with hot air at 90° C. for 3 min. | 10 parts | | |
| Example 8 | *Silicone-containing graft polymer obtained in Reference Example 6 | 15 parts | Same as above. | |
| | *Ultraviolet ray-curable type, epoxy-modified acrylate (UNIDICK 15-868A, manufactured by DAINIPPON INK & CHEMICALS, INC.) | 50 parts | | |
| | *Hydroxypivalic acid neopentylglycol diacrylate | 15 parts | | |
| | *Trimethylolpropane | 15 parts | | |

TABLE 2-continued

| | Formulation of surface treating agent for magnetic layer and treating condition | | Formulation of treating agent for substrate and treating conditions | |
|---|---|---|---|---|
| | triacrylate | | | |
| | *Ultraviolet light initiator (Irgacure 651 3 parts and chlorothioxanthone 2 parts) The above materials were dissolved in a mixed solvent of toluene/MEK/ ethyl acetate (1/1/1 by weight) at a concentration of 3%. The resulting solution was coated and then cured by irradiating it with an ultraviolet ray emitted from two high pressure mercury lamps (beam-condensing type, 160 W/cm, manufactured by ORC Manufacturing Co., Ltd.), at a tape speed of 50 m/min. | 5 parts | | |
| Example 9 | *Carboxy group-containing silicone-containing graft polymer obtained in Reference Example 8 | 41 parts | Same as above. | |
| | *Polyol type acrylic copolymer resin | 40 parts | | |
| | *Isocyanate curing agent (xylene diisocyanate) A mixture of the above components was dissolved in a mixed solvent consisting of MEK, ethyl acetate and toluene (3/1/1 by weight) to form a 3% solution, and this solution was coated on the metallized tape, cured by drying it with hot air at 90° C. for 3 min. | 19 parts | | |
| Comparative Example 5 | Stearic acid was dissolved in a mixed solvent of toluene/MEK (1/1 by weight) at a concentration of 3%. The resulting solution was coated and dried with hot air at 90° C. for 2 min. | | *System obtained by removing the silicone-containing graft polymer from the composition used in Example 6 | 98 parts |
| | | | *Glycerine monostearate as a lubricant The above materials were dissolved in a mixed solvent of toluene/MEK. The resulting solution was coated and dried with hot air. | 2 parts |
| Comparative Example 6 | *System obtained by removing the silicone-containing graft polymer from the composition of Example 6 | 98 parts | Same as above. | |
| | *Fatty acid ester (glycerine monostearate) as a lubricant The above materials were dissolved in a mixed solvent of toluene/MEK/ ethyl acetate (1/1/1 by weight) at a concentration of 3%. The resulting solution was coated and then cured by irradiating it with an ultraviolet light emitted from two high pressure mercury lamps (beam-condensing type, 160 W/cm, manufactured by ORC Manufacturing Co., Ltd.), at a tape speed of 50 m/min. | 2 parts | | |
| Comparative Example 7 | A film of silicon oxide of 300 Å in thickness was formed by a sputtering method. | | Same as above. | |

TABLE 3

| | Surface of magnetic layer | | | | Backside of substrate | | |
|---|---|---|---|---|---|---|---|
| | Effect on electromagnetic transduction characteristics | Dynamic friction coefficient ($\mu$) | Wear resistance | Corrosion resistance | Adhesion | Dynamic friction coefficient ($\mu$) | Wear resistance |
| Example 6 | No change | 0.13 | ⊙ | No change after one month | ⊙ | 0.17 | ⊙ |
| Example 7 | Same as above | 0.17 | Same as above | Same as above | Same as above | Same as above | Same as |

TABLE 3-continued

| | Surface of magnetic layer | | | | Backside of substrate | | |
|---|---|---|---|---|---|---|---|
| | Effect on electromagnetic transduction characteristics | Dynamic friction coefficient ($\mu$) | Wear resistance | Corrosion resistance | Adhesion | Dynamic friction coefficient ($\mu$) | Wear resistance |
| Example 8 | Same as above | 0.09 | Same as above | Same as above | Same as above | Same as above | above Same as above |
| Example 9 | Same as above | 0.14 | Same as above | Same as above | Same as above | Same as above | Same as above |
| Comparative Example 5 | Same as above | 0.32 | x — Δ | Occurence of rust spots after about 10 days | Same as above | 0.22 | Δ |
| Comparative Example 6 | Same as above | 0.25 | Δ — O | Occurence of rust spots after about 3 weeks | Same as above | Same as above | Same as above |
| Comparative Example 7 | Same as above | 0.45 | ⊙ | Occurrence of rust spots after about 2 weeks | Same as above | Same as above | Same as above |

*Electromagnetic transduction characteristics was evaluated by observing the variation of output compared with the untreated tape at frequencies of 1 to 4 Hz when a video deck was used.
*Dynamic friction coefficient ($\mu$) was measured by using a HEIDON's surface tester and a sapphire needle of 10.0 mm in diameter.
*Wear resistance was evaluated by fixing a test tape to a video deck and running the tape for 5 min, and then observing the scratch and peeling on both sides of the tape by a microscope.
*Corrosion resistance was evaluated by observing the change of the surface of magnetic layer with time by a microscope when a test tape was stored in an environment of 60% and 95% relative humidity.
*Adhesion was evaluated by a cellotape test.

As appreciated from the above results, the magnetic recording media produced according to this invention had improved low frictional properties, wear resistance and corrosion resistance without reducing the electromagnetic transduction characteristics of the magnetic layers and accordingly had an excellent durability and running stability. Further, these recording media had no scar by reel, hub, or the like even on the back of the substrate and neither dew condensation nor blocking were caused.

EXAMPLE 10

On the surface of a vertical magnetic recording medium consisting of a substrate composed of a polyimide resin and having a very good surface (surface roughness: about 0.005$\mu$), and a Co-Cr magnetic layer of vertical anisotropy formed on the substrate by a sputtering method, was coated a treating agent having the following formulation by a spinner coating method, thereby producing a vertical magnetic medium having a protective film of about 100 Å in thickness.

| | |
|---|---|
| Silicone-containing graft polymer obtained in Reference Example 5 | 30 parts |
| Ultraviolet ray-curable type resin of high hardness (UNIDICK 17-824, manufactured by DAINIPPON INK & CHEMICALS, INC.) | 64 parts |
| Photopolymerization initiator (Irgacure 651 2 parts and chlorothioxanthone 1 part) | 3 parts |
| Methacryloxyethyl phosphate | 3 parts |

The above materials were dissolved in a mixed solvent of toluene/MIBK/ethyl acetate (1/1/1 by weight) at a concentration of 5%. The resulting solution was coated and irradiated with an ultraviolet ray emitted from a water-cooling type high pressure mercury lamp (Jet Light JL-4300, manufactured by ORC Manufacturing Co., Ltd.). The coating was cured in 30 sec.

The vertical magnetic recording medium produced above had excellent corrosion resistance and environment resistance. Further, the recording medium showed a good result in contact-start-stop test wherein no abnormality was observed in respect of surface scar, wear, etc.

REFERENCE EXAMPLE 9

In a flask equipped with a condenser and a stirrer were placed 30 parts of the silicone-containing macromonomer obtained in Reference Example 5, 40 parts of MMA, 20 parts of EA, 10 parts of GMA, 1.5 parts of AIBN and 230 parts of toluene. They were subjected to polymerization at 75° C. for 10 hr in a nitrogen atmosphere to obtain a 30% solution of an epoxy group-containing, silicone-containing graft polymer.

Then, this graft polymer was reacted with AA, which is a carboxyl group-containing compound, to obtain an acrylate group-containing, silicone-containing graft polymer. In this reaction, 66.7 parts of the epoxy group containing, silicone-containing graft polymer solution, 1.02 parts of AA and 0.3 part of TBAB were placed in a flask equipped with a condenser and a stirrer, and they were heated at 90° C. for 5 hr in a nitrogen atmosphere. The infrared absorption spectrum of the resulting graft polymer showed a peak of —OH at 3,450 to 3,550 cm$^{-1}$ and a peak of C=C based on acrylate at 1,620 to 1,640 cm$^{-1}$.

REFERENCE EXAMPLE 10

Into a solution of 220 g (0.1 mole) of the same $\alpha,\omega$-dihydroxydimethylpolysiloxane as in Reference Example 6 and 9.49 g (0.12 mole) of pyridine dissolved in 400 g of diethyl ether was slowly dropped a 10% diethyl ether solution of 22.06 g (0.1 mole) of $\gamma$-methacryloxypropyldimethylchlorosilane over 20 min at room temperature.

Reaction started immediately and a white crystal of pyridine hydrochloride precipitated. After completion of the dropping, stirring was continued for a further 1 hr at room temperature and then the crystal of pyridine hydrochloride was removed by filtration.

Next, the filtrate was transferred to a separating funnel. Thereto was added 500 g of water, and the flask was thoroughly shaken for water-washing the filtrate. Then, the separating funnel was allowed to stand, thereby separating the upper ether layer from the lower water layer. The resulting ether layer was mixed with anhydrous Glauber's salt and allowed to stand for one night for dehydration. The anhydrous Glauber's salt was removed by filtration. The resulting filtrate was subjected to distillation under reduced pressure to remove the ether, thereby obtaining 205 g of a colorless, transparent, silicone-containing macromonomer.

Using this macromonomer and the same manner as in Reference Example 9, an epoxy group-containing, silicone-containing graft polymer was obtained. Using this graft polymer and the same manner as in Reference Example 9, an acrylate group-containing, silicone-containing graft polymer was obtained.

REFERENCE EXAMPLE 11

The 20% toluene solution of a silicone-containing macromonomer obtained in Reference Example 6 was subjected to distillation under reduced pressure to remove the toluene, whereby a colorless, transparent, oily macromonomer was obtained. In a four-necked flask equipped with a stirrer, a thermometer, a condenser and a nitrogen-introducing tube were placed 30 parts of this macromonomer, 60 parts of MMA, 10 parts of AA, 1 part of AIBN and 300 parts of MEK. They were heated at 75° C. for 9 hr in a nitrogen atmosphere to obtain a 25% MEK solution of a carboxyl group-containing, silicone-containing graft polymer. In a flask equipped with a condenser, a stirrer and a thermometer were placed 100 parts of this graft polymer, 4.93 parts of GMA and 0.5 part of TBAB. They were reacted at 80° C. for 10 hr to obtain an acrylate group-containing, silicone-containing graft polymer.

REFERENCE EXAMPLE 12

20 Parts of the silicone-containing macromonomer obtained in Reference Example 5, 35 parts of MMA, 35 parts of EA, 10 parts of 2-hydroxyethyl methacrylate (hereinafter referred to as HEMA), 1.5 parts of AIBN and 230 parts of toluene were treated in the same manner as in Reference Example 11, whereby a 30% toluene solution of a hydroxyl group-containing, silicone-containing graft polymer was obtained. In a flask were placed 100 parts of this graft polymer solution, 100 parts of toluene and 2.19 parts of pyridine. Into this mixture was slowly dropped 20.8 parts of a 10% toluene solution of acrylic acid chloride with stirring. Reaction started immediately and a white precipitate of pyridine hydrochloride appeared. After completion of the dropping, heating was continued at 50° C. for a further 5 hr. After cooling, pyridine hydrochloride was removed by filtration to obtain an acrylate group-containing, silicone-containing graft polymer.

EXAMPLES 11 to 13 and COMPARATIVE EXAMPLES 8 to 10

On a PET film substrate of 12μ in thickness was formed a magnetic layer of a ferromagnetic alloy thin film consisting of 80% Co and 20% Ni, by a vacuum deposition method while forcibly introducing oxygen gas, thereby forming a metallized tape. On the magnetic layer of this metallized tape or on the back of the substrate was coated a treating agent having the formulation shown in Table 4 by a slit reverse coating method, and cured by drying it with hot air and by irradiating it with an ultraviolet ray. In this way, in all of Examples 11 to 13 and COMPARATIVE EXAMPLES 8 to 10, a film of about 300 Å in thickness was formed on the magnetic layer and a film of about 1μ in thickness was formed on the back of the substrate. The resulting metallized tapes were subjected to measurement of characteristic properties at the magnetic layer and the back of the substrate. The results are shown in Table 5.

TABLE 4

| | Formulation of surface treating agent for magnetic layer and treating conditions | | Formulation of treating agent for substrate and treating conditions | |
|---|---|---|---|---|
| Example 11 | Benzoin ether (radical polymerization initiator) was added to the acryloyl group-containing, silicone-containing graft polymer obtained in Reference Example 9 at a concentration of 5%. This mixture was dissolved in a mixed solvent of toluene/MEK/ethyl acetate (1/1/1 by weight) at a concentration of 3%. The resulting solution was coated and then cured by drying it with hot air (90° C. for 1 min.) and irradiating it with an ultraviolet light (beam-condensing type lamp of 160 W/cm) at a tape speed of 50 m/min. | | *Silicone-containing graft polymer obtained in Reference Example 11 | 20 parts |
| | | | *Urethane-modified acrylate (UNIDICK 17-806, manufactured by DAINIPPON INK & CHEMICALS, INC.) | 54 parts |
| | | | *Hydroxypivalic acid neopentyl-glycol diacrylate | 10 parts |
| | | | *PE wax (Sun Wax 101, manufactured by SANYO CHEMICAL INDUSTRIES LIMITED) | 3 parts |
| | | | *Cellulose derivative (CAB 551-001, manufactured by Eastman Kodak) | 3 parts |
| | | | *Carbon black (MA-100, manufactured by Mitsubishi Chemical Industries, Ltd.) | 5 parts |
| | | | *Ultraviolet ray polymerization initiator (Ingacure 651 3 parts and 2-chlorothioxanthone 2 parts) The above materials were dissolved in a mixed solvent of toluene/MEK (1/1 by weight) at a concentration of 20%. The resulting solution was coated and then cured by irradiating it with an ultraviolet light (two high pressure mercury lamps, 160 W/cm, manufactured by ORC Manufacturing Co., Ltd.) at a tape speed of 40 m/min. | 5 parts |
| Example 12 | *Silicone-containing graft polymer obtained in Reference Example 11 | 30 parts | Same as above. | |
| | *Oligoester acrylate (ARONIX 8600, manu- | 50 parts | | |

TABLE 4-continued

| | Formulation of surface treating agent for magnetic layer and treating conditions | | Formulation of treating agent for substrate and treating conditions | |
|---|---|---|---|---|
| | factured by Toa Gosei Chemical Industry Co., Ltd.) | | | |
| | *Special acrylate (ARONIX M-215, manufactured by Toa Gosei Chemical Industry Co., Ltd.) | 10 parts | | |
| | *Neopentylglycol diacrylate monomer The above materials were dissolved in a mixed solvent of toluene/MEK/ethyl acetate (1/1/1 by weight) at a concentration of 3%. The resulting solution was coated and then cured by irradiating it with electron rays (electron curtain beam type, dose 5 Mrad). | 10 parts | | |
| Example 13 | *Silicone-containing graft polymer obtained in Reference Example 12 | 15 parts | Same as above | |
| | *Epoxy-modified acrylate (VR-77, manufactured by Showa Highpolymer Co., Ltd.) | 40 parts | | |
| | *Dipentaerythritol hexacrylate | 30 parts | | |
| | *Oligoester acrylate (M-6250, manufactured by Toa Gosei Chemical Industry Co., Ltd.) | 10 parts | | |
| | *Ultraviolet ray polymerization initiator (Ingacure 611 3 parts and 2-ethylthioxanthone 2 parts) The above materials were dissolved in a mixed solvent of toluene/MEK/ethyl acetate (1/1/1 by weight) at a concentration of 3%. The resulting solution was coated and then cured by irradiating it with an ultraviolet ray (two high pressure mercury lamps, 160 cm/min, manufactured by ORC Manufacturing Co., Ltd.) at a tape speed of 50 m/min. | 5 parts | | |
| Comparative Example 8 | Stearic acid was dissolved in a mixed solvent of toluene/MEK (1/1 by weight) at a concentration of 3%. The resulting solution was coated and then cured by drying it with hot air (90° C. for 2 min.) | | *System obtained by removing the acryloyl group-containing, silicone-containing graft polymer from the composition used in Example 7 | 98 parts |
| | | | *Glycerine monostearate as a lubricant The above materials were dissolved in a mixed solvent of toluene/MEK at a concentration of 20%. The resulting solution was coated and then cured by an ultraviolet ray. | 2 parts |
| Comparative Example 9 | *The same resin composition as in Example 13, except that the silicone-containing graft polymer was not used. | 98 parts | Same as above | |
| | *Fatty acid ester as a lubricant The above materials were dissolved in a mixed solvent of toluene/MEK/ethyl acetate | 2 parts | | |

TABLE 4-continued

| | Formulation of surface treating agent for magnetic layer and treating conditions | Formulation of treating agent for substrate and treating conditions |
|---|---|---|
| | (1/1/1 by weight) at a concentration of 3%. The resulting solution was coated and then cured under the same conditions as in Example 4. | |
| Comparative Example 10 | A silicon oxide film of 300 Å in thickness was formed by a sputtering method. | Same as above |

TABLE 5

| | Surface of magnetic layer | | | | | Back of substrate | | |
|---|---|---|---|---|---|---|---|---|
| | Effect on electromagnetic transduction characteristics | Dynamic friction coefficient (μ) | Wear resistance | | Corrosion resistance | Adhesion | Dynamic friction coefficient (μ) | Wear resistance (after running) |
| | | | After running | Scratch strength | | | | |
| Example 11 | No change | 0.15 | ⊚ | 200 g | No change after 1 month | ⊚ | 0.13 | ⊚ |
| Example 12 | Same as above | 0.10 | ⊚ | 250 g or more | Same as above | ⊚ | 0.13 | ⊚ |
| Example 13 | Same as above | 0.13 | ⊚ | 250 g or more | Same as above | ⊚ | 0.13 | ⊚ |
| Comparative Example 8 | Same as above | 0.32 | x − Δ | 60 g | Occurrence of rust spots after about 10 days | ◯ | 0.17 | x − Δ |
| Comparative Example 9 | Same as above | 0.23 | Δ − ◯ | 140 g | Occurrence of rust spots after about 3 weeks | ◯ | 0.17 | x − Δ |
| Comparative Example 10 | Same as above | 0.45 | ◯ − ⊚ | 200 g | Occurrence of rust spots after about 2 weeks | ◯ | 0.17 | x − Δ |

*Electromagnetic transduction characteristics was evaluated by observing the variation of output compared with the untreated tape at frequencies of 1 to 4 Hz when a video deck was used.
*Dynamic friction coefficient (μ) was measured by using a HEIDON's surface tester and a sapphire needle of 10.0 mm in diameter.
*Wear resistance was evaluated by fixing a test tape to a video deck and running the tape for 5 min, and then observing the scratch and peeling on both sides of the tape by a microscope.
*Scratch strength was measured by load variation when a sapphire needle of 2 mm in diameter was used.
*Corrosion resistance was evaluated by observing the change of the surface of magnetic layer with time by a microscope when a test tape was stored in an environment of 60% and 95% relative humidity.
*Adhesion was evaluated by a cellotape test.

As appreciated from the above results, the magnetic recording media of this invention having a surface coated with an active energy rays-curable graft polymer had an improved low frictional properties, wear resistance, water repellency and corrosion resistance without reducing the electromagnetic transduction characteristics of the magnetic layer. Accordingly, these recording media were excellent in durability, constant in friction coefficient as seen from FIG. 3 and excellent in running stability. Further, the recording media had no scar by reel, hub, or the like at the back of the substrate and neither dew condensation nor blocking were caused.

EXAMPLE 14

On a substrate composed of an amorphous, thermoplastic polyetherimide resin (ULTEM produced by General Electric), having a very good surface (surface roughness: about 0.005μ) was formed a Co-Cr magnetic layer of vertical anisotropy by a sputtering method, thereby producing a vertical magnetic recording medium. On the surface of this recording medium was coated a treating agent having the following formulation by a spinner coating method, thereby obtaining a vertical magnetic medium having a protective film of about 100 to 150 Å in thickness:

| | |
|---|---|
| Acryloyl group-containing, silicone-containing graft polymer obtained in Reference Example 9 | 30 parts |
| Urethane-modified acrylate polymer having a terminal acryloyl group, of high hardness (UNIDICK 17-859, manufactured by DAINIPPON INK & CHEMICALS, INC.) | 40 parts |
| Oligoester acrylate (ARONIX M-8060, manufactured by Toa Gosei Chemical Industry Co., Ltd.) | 30 parts |

The above materials were dissolved in a mixed solvent of ethanol/toluene/ethyl acetate (3/1/1 by weight) at a concentration of 2%. The resulting solution was coated and then cured by irradiating it with electron radiations.

The vertical magnetic recording medium of this invention thus obtained had excellent corrosion resistance and environment resistance. Further, it showed a good result in contact-start-stop test and there was seen neither scar nor wear at the back.

What is claimed is:

1. A magnetic recording medium consisting essentially of (a) a substrate (b) a ferromagnetic metal thin film formed on the surface of the substrate (a) and (c) a lubricating coating layer comprising a silicone-containing graft polymer comprising a macromonomer as one of the constituents, the silicone-containing graft polymer being produced by copolymerizing the silicone-containing macromonomer with a radical-polymerizable monomer, the amount of the silicone-containing macromonomer used in the copolymerization being from 2 to 90 parts by weight based on 100 parts by weight of the sum of the amount of the silicone-containing macromonomer and the radical-polymerizable monomer, the lubricating coating layer (c) being formed (i) on the ferromagnetic metal thin film (b), or (ii) on the back of the substrate (a), or (iii) on the ferromagnetic metal thin film (b) and the back of the substrate (a).

2. A magnetic recording medium according to claim 1, wherein the silicone-containing graft polymer is a graft polymer obtained by copolymerizing a macromonomer having a radical-polymerizable functional group with a radical-polymerizable monomer.

3. A magnetic recording medium according to claim 2, wherein the silicone-containing graft polymer is a graft polymer obtained by copolymerizing a radical-polymerizable monomer with a macromonomer obtained by reacting a living polymer obtained by an anionic polymerization of a cyclic siloxane represented by the formula (A):

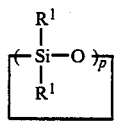

wherein $R^1$ is a methyl, ethyl or phenyl group and p is 3 or 4, with a silicone compound represented by the formula (B):

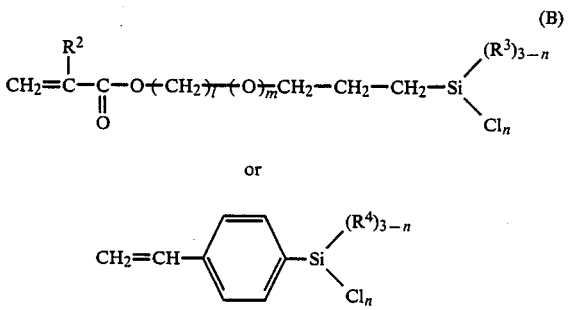

wherein $R^2$ is a hydrogen atom or a methyl group; m is 0 or 1, $R^3$ and $R^4$ are methyl, ethyl or phenyl groups, n is an integer of 1 to 3, and l is 0 or an integer of 1–2 when m=0 or l is 2 when m=1.

4. A magnetic recording medium according to claim 2, wherein the silicone-containing graft polymer is a graft polymer obtained by copolymerizing a radical-polymerizable monomer with a macromonomer obtained by reacting a silicone represented by the formula (A'):

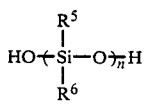

wherein $R^5$ and $R^6$ are independently monovalent, aliphatic hydrocarbon groups having 1 to 10 carbon atoms, phenyl groups, or monovalent, halogenated hydrocarbon groups, and n is an integer in the range 1–500, with an acrylic compound represented by the formula (B'):

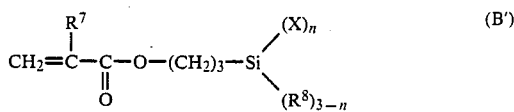

wherein $R^7$ is a hydrogen atom or a methyl group, $R^8$ is a methyl, ethyl or phenyl group, X is a chlorine atom or a methoxy or ethoxy group, and n is an integer of 1 to 3.

5. A magnetic recording medium according to claim 3, wherein the radical-polymerizable monomer is at least one member selected from the group consisting of olefinic compounds, vinyl halides, vinyl esters of organic acids, vinyl aromatic compounds, alkyl acrylates and methacrylates, N-vinyl compounds, vinylsilane compounds, acrylsilane compounds and di-substituted ethylenes.

6. A magnetic recording medium according to claim 3, wherein the radical-polymerizable monomer is at least one member selected from the group consisting of alkyl acrylates and methacrylates.

7. A magnetic recording medium according to claim 3, wherein the radical-polymerizable monomer is at least one member selected from the group consisting of ethyl acrylate, butyl acrylate and methyl methacrylate.

8. A magnetic recording medium according to claim 4, wherein the radical-polymerizable monomer is at least one member selected from the group consisting of olefinic compounds, vinyl halides, vinyl esters of organic acids, vinyl aromatic compounds, alkyl acrylates and methacrylates, N-vinyl compounds, vinylsilane compounds, acrylsilane compounds and di-substituted ethylenes.

9. A magnetic recording medium according to claim 4, wherein the radical-polymerizable monomer is at least one member selected from the group consisting of alkyl acrylates and methacrylates.

10. A magnetic recording medium according to claim 4, wherein the radical-polymerizable monomer is at least one member selected from the group consisting of ethyl acrylate, butyl acrylate and methyl methacrylate.

11. A magnetic recording medium according to claim 1, wherein the silicone-containing graft polymer is a graft polymer having a functional group which starts its reaction upon irradiating it with active energy rays.

12. A magnetic recording medium according to claim 11, wherein the functional group which starts its reaction upon irradiating it with active energy rays is a cinnamic acid residue, a furylacrylic acid residue, a chalcon residue, an acrylic acid residue, a methacrylic acid residue or an epoxy group.

13. A magnetic recording medium according to claim 11, wherein the group which starts its reaction upon irradiating it with active energy rays is a cinnamic acid residue or acrylic acid residue.

14. A magnetic recording medium according to claim 1, wherein the silicone-containing graft polymer is a graft polymer having a carboxyl group.

15. A magnetic recording medium according to claim 1, wherein the silicone-containing graft polymer is a graft polymer having a hydroxyl group.

* * * * *